United States Patent
Ölsner et al.

(10) Patent No.: US 12,147,245 B2
(45) Date of Patent: Nov. 19, 2024

(54) METHOD FOR CONTROLLING AN UNMANNED AERIAL VEHICLE FOR AN INSPECTION FLIGHT TO INSPECT AN OBJECT AND INSPECTION UNMANNED AERIAL VEHICLE

(71) Applicant: Spleenlab GmbH, Saalburg-Ebersdorf (DE)

(72) Inventors: Florian Ölsner, Jena (DE); Benjamin Lewandowski, Erfurt (DE); Chris Hagen, Bad Lobenstein (DE); Ashwanth Ammapalayam Ravichandran, Bad Lobenstein (DE); Stefan Milz, Saalburg-Ebersdorf (DE)

(73) Assignee: Spleenlab GmbH, Saalburg-Ebersdorf (DE)

( * ) Notice: Subject to any disclaimer, the term of this patent is extended or adjusted under 35 U.S.C. 154(b) by 81 days.

(21) Appl. No.: 17/939,165

(22) Filed: Sep. 7, 2022

(65) Prior Publication Data
US 2023/0073120 A1    Mar. 9, 2023

(30) Foreign Application Priority Data
Sep. 7, 2021   (DE) .................. 10 2021 123 124.8

(51) Int. Cl.
*G05D 1/00* (2024.01)
*B64C 39/02* (2023.01)
*B64U 101/30* (2023.01)

(52) U.S. Cl.
CPC .......... *G05D 1/042* (2013.01); *B64C 39/024* (2013.01); *G05D 1/0088* (2013.01); *B64U 2101/30* (2023.01); *B64U 2201/10* (2023.01)

(58) Field of Classification Search
CPC .... G05D 1/042; G05D 1/0088; G05D 1/0094; B64C 39/024; B64U 2101/30; B64U 2201/10
USPC ............................................................. 701/4
See application file for complete search history.

(56) References Cited

U.S. PATENT DOCUMENTS

| | | | |
|---|---|---|---|
| 10,527,423 | B1 | 1/2020 | Pavlyuk et al. |
| 2016/0070265 | A1* | 3/2016 | Liu ............... B64C 39/024 701/25 |
| 2016/0292869 | A1* | 10/2016 | Hammond ....... G05D 1/0044 |

(Continued)

FOREIGN PATENT DOCUMENTS

| | | |
|---|---|---|
| DE | 102017205647 | 9/2018 |
| WO | 2018195955 | 11/2018 |

*Primary Examiner* — Tyler D Paige
(74) *Attorney, Agent, or Firm* — Boyle Fredrickson, S.C.

(57) ABSTRACT

The invention relates to a method for controlling an inspection flight of an unmanned aerial vehicle for purposes of inspecting an object, and to an inspection unmanned aerial vehicle. The method comprises the following: recording of image data for an object by means of a camera device on an unmanned aerial vehicle during a first flight path in a flight coordinates system in the vicinity of the object; and recording of depth data by means of a depth sensor device on the unmanned aerial vehicle, wherein the depth data indicate distances between the unmanned aerial vehicle and the object during the first flight path. Flight trajectory coordinates for the unmanned aerial vehicle are determined for purposes of inspecting the object, which avoids collision with the object.

9 Claims, 2 Drawing Sheets

(56) References Cited

U.S. PATENT DOCUMENTS

2019/0206073 A1\* 7/2019 Huang .................. G08G 5/045
2021/0263515 A1\* 8/2021 Henry .................... H04N 23/64

\* cited by examiner

METHOD FOR CONTROLLING AN UNMANNED AERIAL VEHICLE FOR AN INSPECTION FLIGHT TO INSPECT AN OBJECT AND INSPECTION UNMANNED AERIAL VEHICLE

FIELD OF THE INVENTION

The invention relates to a method for controlling an unmanned aerial vehicle for an inspection flight, for purposes of inspecting an object, and to an inspection unmanned aerial vehicle.

BACKGROUND

Unmanned aerial vehicles can be used to inspect objects, for example, buildings, mobile radio towers, wind turbines, or similar. The flight path (movement) or flight trajectory of the aerial vehicle is controlled with the aid of a control device, which provides control signals in order to control, for example, propulsion devices and rudders. In this context, when determining the control signals for the flight path of the aircraft (aerial vehicle), it is of known art to take into account sensor signals from a sensor device, which register environmental parameters for the environment of the aircraft, and to execute the flight path as a function of such sensor signals.

From the document DE 10 2017 205 647 A1 a method for determining a path along an object is of known art. The method comprises a step: "determination of a reference point of the object in absolute coordinates", a step: "determination of a set of points of the object in absolute coordinates on the basis of further points of the object in a relative coordinates system, wherein the conversion of the further points of the object into the absolute coordinates system takes place on the basis of the reference point of the object", and a step: "determination of the path along the object, on the basis of the set of points of the object, such that the path is spaced apart from the object".

Document U.S. Pat. No. 10,527,423 B1 discloses a system and a method for autonomous localization of a ground, surface or aerial vehicle with respect to a surface of a complex shape. Localization is used by way of an optical flow method. Sensed optical (electro-optical, infrared, thermal) images are augmented by depth data, i.e., distance from the distance sensor to points on the sensed surface object. A modification of the optical flow method is applied to sequence of frames obtained in such a way to compute displacement of the vehicle with respect to the surface object.

SUMMARY

The object of the invention is to provide a method for controlling an unmanned aerial vehicle for an inspection flight, for purposes of inspecting an object, and an inspection unmanned aerial vehicle, with which an extensive level of automation, up to the fully automatic execution of the inspection flight, is enabled.

A method for controlling an unmanned aerial vehicle for an inspection flight, for purposes of inspecting an object, in accordance with one aspect of the claims is provided as the solution. Furthermore, an inspection unmanned aerial vehicle is provided in accordance with another aspect of the claims. Configurations are the subject matter of dependent claims.

In accordance with one aspect, a method for controlling an unmanned aerial vehicle for an inspection flight, for purposes of inspecting an object, is provided, in which the following are provided: recording of image data for an object by means of a camera device, which is arranged on an unmanned aerial vehicle, during a first flight path (movement) of the unmanned aerial vehicle in a flight coordinates system in the vicinity of the object, and recording of depth data by means of a depth sensor device, which is arranged on the unmanned aerial vehicle, wherein the depth data indicate distances between the unmanned aerial vehicle and the object during the first flight path. In the course of processing of the image data and the depth data by means of an evaluation device, the following are provided: execution of an image analysis on the basis of artificial intelligence for the image data, wherein here the object is recognized from the image data with the aid of image recognition on the basis of artificial intelligence, and for image pixels, which are associated with the recognized object, pixel coordinates are determined in a camera coordinates system of the camera device; execution of a fusion of sensor data for the image data and the depth data, wherein here depth data associable with each of the image pixels of the object are determined, and from the associated depth data at least one object reference point for the object is determined; and determination of position coordinates for the at least one object reference point in the flight coordinates system, wherein the position coordinates indicate a position of the object in the flight coordinates system. Next, the method furthermore provides for the following: determination of flight trajectory coordinates for the unmanned aerial vehicle for an inspection flight, for purposes of inspecting the object, which avoids collision with the object, which takes into account the position coordinates for the at least one object reference point; and controlling of the unmanned aerial vehicle during a second flight path (movement) such that the unmanned aerial vehicle here executes the collision-avoiding inspection flight in accordance with the flight trajectory coordinates, by means of a control device of the unmanned aerial vehicle.

In accordance with a further aspect, an inspection unmanned aerial vehicle is provided, which has a camera device, a depth sensor device, an evaluation device, which has one or more processors configured for data processing; and a control device, which is configured to control an operation of the inspection unmanned aerial vehicle. To execute an inspection flight, for purposes of inspecting an object, the inspection aerial vehicle is configured for the following: recording of image data for an object by means of the camera device, which is arranged on an unmanned aerial vehicle, during a first flight path (movement) of the unmanned aerial vehicle in a flight coordinates system in the vicinity of the object; recording of depth data by means of the depth sensor device, which is arranged on the unmanned aerial vehicle, wherein the depth data indicate distances between the unmanned aerial vehicle and the object, during the first flight path. The processing of the image data and the depth data by means of the evaluation device here provides for the following: execution of an artificial intelligence-based image analysis for the image data, wherein here the object is recognized from the image data with the aid of artificial intelligence-based image recognition, and for image pixels, which are associated with the recognized object, pixel coordinates are determined in a camera coordinates system of the camera device; execution of a fusion of sensor data for the image data and the depth data, wherein here depth data associable with each of the image pixels of the object are determined, and at least one object reference point for the object is determined from the associated depth data; and determination of position coordinates for the at least one object reference point, wherein the position coordinates indicate a position of the object in the flight coordinates system. The inspection aerial vehicle is furthermore configured to execute the inspection flight for the following: determination of flight trajectory coordinates for the unmanned aerial vehicle in the flight coordinates system for an inspection flight that avoids collision with respect to the object, for purposes of inspecting the object, taking into account the position coordinates for the at least one object reference point, and control of the unmanned aerial vehicle during a second flight path (movement), such that the unmanned aerial vehicle here executes the collision-avoiding inspection flight in accordance with the flight trajectory coordinates, by means of the control device of the unmanned aerial vehicle.

For the execution of the inspection flight, for purposes of inspecting any desired object, for example a building, a tower, a wind turbine, or similar, in the course of a first flight path of the unmanned aerial vehicle, image data for the object, and depth data, are recorded, which are evaluated using artificial intelligence by means of an image analysis, in order to recognise or determine the object, so that position coordinates for a position of the object in the flight coordinates system are finally determined, wherein further measured data of an inertial measurement device and of a position determination system of the aerial vehicle can be included. Such position coordinates can be determined for one or a plurality of object reference points (reference points on the object). On this basis, a flight trajectory or flight path for the inspection flight of the unmanned aerial vehicle, for purposes of inspecting the object, can then be determined by determining corresponding flight trajectory coordinates. On the basis of these flight trajectory coordinates, the control device of the unmanned aerial vehicle controls the collision-avoiding inspection flight, for purposes of inspecting the object (second flight path). In this manner, the position of the object that is to be inspected is determined automatically using artificial intelligence, in order then to execute the inspection flight as a function of the latter. In particular, there is no need for a first manually controlled overflight of the object that is to be inspected in order to determine manually its position for a subsequent determination of a flight trajectory, as is provided for in the prior art.

The at least one object reference point can be determined in accordance with an object point of the object, for which an average distance between the unmanned aerial vehicle and the object is determined from the associated depth data. In this form of embodiment, a simplified configuration is provided, in which an averaged position is determined for the object that is to be inspected, and the flight path during the inspection flight is controlled with respect to the latter.

In the course of processing the image data and/or the depth data, a three-dimensional model for the object can be determined. On the basis of recorded image data and depth data, which can optionally be supplemented with further sensor data, a three-dimensional (computer) model for the object is determined by means of the evaluation device of the unmanned aerial vehicle, wherein optionally supplementary information and/or data processing capacity can be drawn on from a central server device by means of wireless data communication. This relates, for example, to design data for the construction of the object, for example a CAD model or a CAD drawing, after the object has been recognized or determined with the aid of the artificial intelligence-based image analysis.

The determination of the three-dimensional model for the object can at least be initiated during the first flight path, optionally its execution can also be completed. Here, at least parts of the three-dimensional model for the object are already determined during the first flight path. Optionally, this information concerning the three-dimensional model can be taken into account in the execution of the first flight path, in particular serving to determine the position of the object, so as to avoid a collision with the object, for example.

The determination of the three-dimensional model for the object can be executed, at least partially, during the second flight path, that is to say, in particular during the inspection flight itself. The second flight path, which comprises, or is formed by, the collision-avoiding inspection flight, can alternatively or additionally be used to determine the three-dimensional model of the object, such that during the second flight path, for example, further image data and/or additional sensor signal data are recorded and used to determine the three-dimensional model and/or for its refinement or supplementation.

The three-dimensional model for the object can be determined in real time during the execution of the first and/or the second flight path by the unmanned aerial vehicle.

The method can further comprise at least one of the following steps: determination of the flight trajectory coordinates, taking into account the three-dimensional model for the object; and determination of updated flight trajectory coordinates, taking into account the three-dimensional model for the object, on the basis of the flight trajectory coordinates, during the collision-avoiding inspection flight. In accordance with one form of embodiment, the three-dimensional model of the object is taken into account when determining the flight trajectory coordinates for the inspection flight, for example, to the effect that the flight trajectory coordinates are determined with respect to the three-dimensional model, such that a collision between the unmanned aerial vehicle and the object is avoided. Alternatively or additionally, the three-dimensional model can be used to update or correct the originally determined flight trajectory coordinates during execution of the inspection flight, for example so as to improve collision avoidance, and/or to adjust or optimise the flight trajectory for the inspection flight, for example, for purposes of inspecting detailed regions of the object.

When determining the position coordinates for the at least one object reference point, the following can be provided: recording of inertial measurement data by means of an inertial measurement device, which is arranged on the unmanned aerial vehicle; recording of position data by means of a position determination device, which is arranged on the unmanned aerial vehicle, wherein the position data indicate a position of the unmanned aerial vehicle in the flight coordinates system; and determination of the position coordinates for the at least one object reference point, on the basis of the inertial measurement data and the position data. The inertial measurement device can, for example, comprise one or a plurality of accelerometers, and one or a plurality of angular rate sensors. The position determination device can, for example, take the form of a GPS device.

The depth data can be recorded by means of at least one depth sensor device arranged on the unmanned aerial vehicle, from the following group: a lidar measurement device, a time-of-flight measurement device, and a radar measurement device. The depth sensor device can be designed with the aid of one or a plurality of such measurement devices. Here, the lidar measurement device, by virtue of its range and intensity, is advantageous for outdoor flights past the object, if long range properties must be achieved, for example when flying past a wind turbine, or similar. The time-of-flight measurement device, and also stereo cameras, often have a rather low weight, and are therefore advantageous for an indoor object inspection, as the aerial vehicle is often smaller in such cases, and can only carry a smaller load.

The embodiments described above in the context of the method can be appropriately provided in the context of the inspection unmanned aerial vehicle.

BRIEF DESCRIPTION OF THE DRAWINGS

In what follows further examples of embodiment are explained in more detail with reference to illustrative figures. Here.

DETAILED DESCRIPTION OF THE PREFERRED EMBODIMENTS

Figure 1:
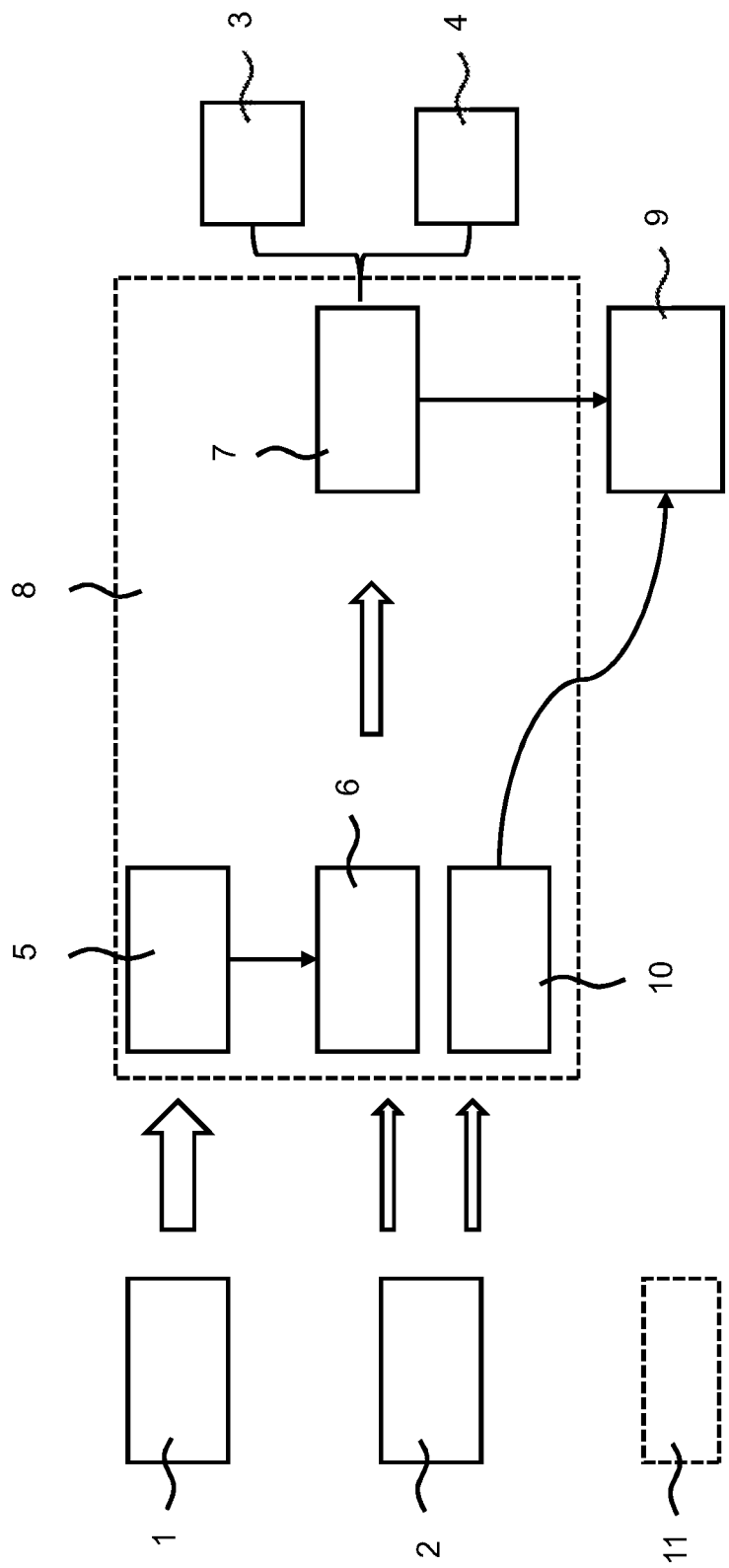
FIG. 1 shows a schematic representation of an arrangement of functional components or devices of an unmanned aerial vehicle.

FIG. 1 shows a schematic representation of an arrangement of functional components or units of an unmanned aerial vehicle (UAV). This takes the form of an aircraft, for example a drone, which is operated and navigates autonomously without a crew on board. Such unmanned aerial vehicles or aircraft are used, for example, to inspect any desired objects, for example buildings, towers such as radio towers, or similar. For this purpose, the unmanned aerial vehicle has measurement or sensor devices, in particular adapted to the particular intended application in order to record sensor signals and measurement data suitable for the inspection task that is to be executed during the inspection flight. This includes, for example, the recording of images for parts of the object that is to be inspected, and/or for the object as a whole. However, the measurement of electric fields in the vicinity of parts of the object can also be an inspection task. For this purpose, the unmanned aerial vehicle can be fitted with the appropriate measurement and sensor devices as required; these can also be arranged on the aerial vehicle in an exchangeable or replaceable manner.

As shown in FIG. 1, the exemplary arrangement for the unmanned aerial vehicle, for example a drone, has a camera device 1, a depth sensor device 2, an inertial measurement device 3, and a position determination system 4. The camera device 1 is used to record image data, in particular for an object that is to be inspected or examined, and optionally for its environment also. The depth sensor device 2 serves in particular to determine depth data for the image recordings. For this purpose, the depth sensor device 2 comprises one or more of the following measurement devices: a lidar measurement device, a time-of-flight measurement device, and a radar measurement device.

In particular, the inertial measurement device 3 can be fitted with acceleration sensors and angular rate sensors (gyroscopic sensors) to record measurement data for a spatial position of the unmanned aerial vehicle. The position determination system 4 can be used to determine the position of the unmanned aerial vehicle in a coordinates system, which forms the flight coordinates system for the flight paths of the unmanned aerial vehicle, for example the GPS system.

With the aid of an image data evaluation device 5, the recorded image data is processed, wherein here an object recognition for the object that is to be inspected is executed using artificial intelligence. For this purpose, for executing the algorithms used in the artificial intelligence and implemented by means of software application(s), methods or models are trained in advance in order to then recognise (determine) the object.

With the aid of a sensor data fusion device 6, the image data recorded by means of the camera device 1, and the depth data recorded by means of the depth sensor device 2, are fused, such that image pixels are each assigned to depth data.

By means of an object localisation device 7, which is part of an evaluation device 8, a position for the object that is to be observed or inspected is determined in the flight coordinates system, using the fused sensor data and the measurement data obtained from the inertial measurement device 3 and the position determination system 4.

On the basis of the position data determined for the object, a flight trajectory for the inspection flight of the unmanned aerial vehicle is determined, so as to control its flight for inspection purposes on this basis, by means of a control device 9 of the unmanned aerial vehicle. Optionally, reference can be made to a two- or three-dimensional model of the object and/or the associated object environment, which is provided with the aid of a model determination device 10 on the basis of the image data and the depth data.

Optionally, one or a plurality of further sensor or measurement devices can be provided.

Figure 2:
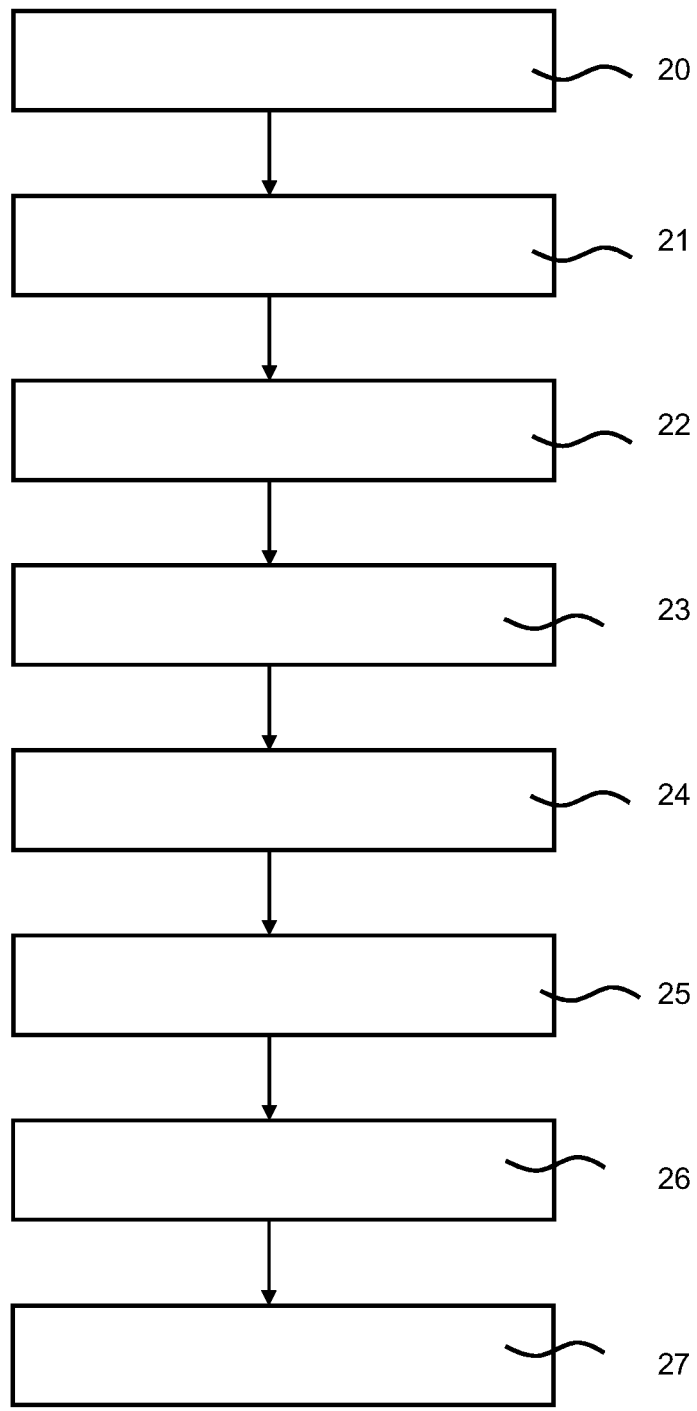
FIG. 2 shows a schematic representation of a method for controlling an unmanned aerial vehicle for an inspection flight, for purposes of inspecting an object.

In accordance with the schematic representation in FIG. 2, a method for controlling the unmanned aerial vehicle for an inspection flight, for purposes of inspecting the object, can be executed with the aid of the arrangement from FIG. 1 as follows. In step 20, image data for the object that is to be inspected is recorded in the flight coordinates system, with the aid of the camera device 1, during a first flight path of the unmanned aerial vehicle in the vicinity of the object. In step 21, which is executed, at least partially, simultaneously with the recording of the image data, depth data indicating distances between the unmanned aerial vehicle and the object that is to be inspected are recorded during the first flight path by means of the depth sensor device 2. During the first flight path, which serves as preparation for the subsequent inspection flight, measurement data is furthermore recorded by means of the inertial measurement device 3 and the position determination system 4 (steps 22, 23).

With the aid of the evaluation device 8, the image data and optionally the depth data are processed (step 24), which comprises the execution of an image analysis for the image data using artificial intelligence, wherein the object is here recognized from the image data with the aid of image recognition based on artificial intelligence, and, in a camera coordinates system of the camera device 1, pixel coordinates are determined for image pixels that are associated with the recognized object. In step 25, a fusion of sensor data for the image data and the depth data is executed with the aid of the sensor data function device 6, wherein depth data associable with the image pixels of the object are determined in each case. At least one object reference point for the object is determined from the associated depth data, for example an object point that corresponds to an average value of the depth data (distances).

In step 26, the data fused by means of the sensor data fusion device 6 is processed by means of the object localisation device 7 in the evaluation device 8, together with the measurement data from the inertial measurement device 3 and the position determination system 4, in order to determine position coordinates for the at least one object reference point in the flight coordinates system, which position coordinates indicate the position of the object in the flight coordinates system. By this means the position of the object that is subsequently to be inspected is determined in an automated manner in the flight coordinates system, which takes the form, for example of the GPS system. Manual steps, such as those envisaged in the prior art, firstly to determine the position of the object before an inspection flight, are eliminated.

On the basis of the knowledge of the position of the object that is to be inspected, a flight trajectory for the inspection flight is determined in the flight coordinates system (step 27) in order subsequently to control the unmanned aerial vehicle for the inspection flight with the aid of the control device 9, in particular to avoid any collisions with the object itself.

Optionally, provision can be made to use measurement data recorded during the preparation flight and/or during the actual inspection flight, in particular the data recorded by the camera device 1 and the depth sensor device 2, so as to determine a two- or three-dimensional model for the object, and optionally its immediate environment, in the evaluation device 8. The model thus created can be called upon as supplementary evidence in the determination of the flight trajectory for the inspection flight. The model originally created can be adjusted or optimised during the inspection flight on the basis of the measurement data then recorded. The two- or three-dimensional model created serves as a basis for the anticipation of possible collisions and, if necessary, for an optimisation of the planning during the flight.

The features disclosed in the above description, in the claims, as well as the drawing, can be of importance for the implementation of the various configurations, both individually and also in any desired combination.

What is claimed is:

1. A method for controlling an inspection flight of an unmanned aerial vehicle for inspecting an object, with:
    recording of image data for an object by means of a camera device, which is arranged on an unmanned aerial vehicle, during a first flight path of the unmanned aerial vehicle in a flight coordinates system in the vicinity of the object;
    recording of depth data by means of a depth sensor device, which is arranged on the unmanned aerial vehicle, wherein the depth data indicate distances between the unmanned aerial vehicle and the object during the first flight path;
    processing of the image data and the depth data by means of an evaluation device, comprising:
        execution of an image analysis on the basis of artificial intelligence for the image data, wherein here the object is recognized from the image data with the aid of image recognition on the basis of artificial intelligence, and for image pixels, which are associated with the recognized object, pixel coordinates are determined in a camera coordinates system of the camera device;
        execution of a fusion of sensor data for the image data and the depth data, wherein here depth data associable with each of the image pixels of the object are determined, and from the associated depth data at least one object reference point is determined for the object; and
        determination of position coordinates for the at least one object reference point in the flight coordinates system, wherein the position coordinates indicate a position of the object in the flight coordinates system;
    determination of flight trajectory coordinates for the unmanned aerial vehicle for an inspection flight for inspecting the object, which avoids collision with the object, taking into account the position coordinates for the at least one object reference point; and
    control of the unmanned aerial vehicle during a second flight path such that the unmanned aerial vehicle here executes the collision-avoiding inspection flight in accordance with the flight trajectory coordinates, by means of a control device of the unmanned aerial vehicle; and
    wherein the at least one object reference point is determined in accordance with an object point of the object, for which an average distance between the unmanned aerial vehicle and the object is determined from the associated depth data.

2. The method according to claim 1, wherein in the course of processing the image data and/or the depth data, a three-dimensional model for the object is determined.

3. The method according to claim 2, wherein the determination of the three-dimensional model for the object is at least initiated during the first flight path.

4. The method according to claim 2, wherein the determination of the three-dimensional model for the object is executed, at least partially, during the second flight path.

5. The method according to claim 2, wherein the three-dimensional model for the object is determined in real time during the execution of the first and/or the second flight path by the unmanned aerial vehicle.

6. The method according to claim 2, wherein at least one of the following steps is provided:
    determination of the flight trajectory coordinates, taking into account the three-dimensional model for the object; and
    determination of updated flight trajectory coordinates, taking into account the three-dimensional model for the object, on the basis of the flight trajectory coordinates, during the collision-avoiding inspection flight.

7. The method according to claim 1, wherein when determining the position coordinates for the at least one object reference point, the following are provided:
    recording of inertial measurement data by means of an inertial measurement device, which is arranged on the unmanned aerial vehicle;
    recording of position data by means of a position determination device, which is arranged on the unmanned aerial vehicle, wherein the position data indicate a position of the unmanned aerial vehicle in the flight coordinates system; and
    determination of the position coordinates for the at least one object reference point, on the basis of the inertial measurement data and the position data.

8. The method according to claim 1, wherein the depth data are recorded by means of at least one depth sensor device, which is arranged on the unmanned aerial vehicle, from the following group: a lidar measurement device, a time-of-flight measurement device, and a radar measurement device.

9. An inspection unmanned aerial vehicle comprising:
a camera device;
a depth sensor device;
an evaluation device, which has one or a plurality of processors configured for data processing; and
a control device, which is configured to control an operation of the inspection unmanned aerial vehicle;
wherein the inspection aerial vehicle for executing an inspection flight for inspecting an object is configured for the following:
  recording of image data for an object by means of a camera device, which is arranged on an unmanned aerial vehicle, during a first flight path of the unmanned aerial vehicle in a flight coordinates system in the vicinity of the object;
  recording of depth data by means of a depth sensor device, which is arranged on the unmanned aerial vehicle, wherein the depth data indicate distances between the unmanned aerial vehicle and the object during the first flight path;
  processing of the image data and the depth data by means of the evaluation device, comprising:
    execution of an image analysis on the basis of artificial intelligence for the image data, wherein here the object is recognized from the image data with the aid of image recognition on the basis of artificial intelligence, and for image pixels, which are associated with the recognized object, pixel coordinates are determined in a camera coordinates system of the camera device;
    execution of a fusion of sensor data for the image data and the depth data, wherein here depth data associable with each of the image pixels of the object are determined, and from the associated depth data at least one object reference point is determined for the object; and
    determination of position coordinates for the at least one object reference point, wherein the position coordinates indicate a position of the object in the flight coordinates system;
  determination of flight trajectory coordinates for the unmanned aerial vehicle in the flight coordinates system for an inspection flight for inspecting the object, which avoids collision with the object, taking into account the position coordinates for the at least one object reference point;
  control of the unmanned aerial vehicle during a second flight path, such that the unmanned aerial vehicle here executes the collision-avoiding inspection flight in accordance with the flight trajectory coordinates, by means of the control device of the unmanned aerial vehicle; and
wherein the at least one object reference point is determined in accordance with an object point of the object, for which an average distance between the unmanned aerial vehicle and the object is determined from the associated depth data.

* * * * *